Feb. 26, 1924.

E. H. ALDEBORGH

GAUGE

Filed Nov. 5, 1920

1,485,154

INVENTOR
Erik H. Aldeborgh
BY Bros Ferrard
his ATTORNEYS

Patented Feb. 26, 1924.

1,485,154

UNITED STATES PATENT OFFICE.

ERIK H. ALDEBORGH, OF POUGHKEEPSIE, NEW YORK, ASSIGNOR TO C. E. JOHANSSON, INC., OF POUGHKEEPSIE, NEW YORK, A CORPORATION OF DELAWARE.

GAUGE.

Application filed November 5, 1920. Serial No. 422,042.

*To all whom it may concern:*

Be it known that I, ERIK H. ALDEBORGH, a subject of the King of Sweden, and resident of Poughkeepsie, in the county of Dutchess and State of New York, have invented a new and useful Improvement in Gauges, of which the following is a specification.

The object of my invention is to provide certain improvements in the construction, form and arrangement of the several working parts of the gauge, whereby lost and inexact motion is eliminated in the conversion of a slight rectilinear motion into an extended circular motion.

A further object is to provide such a device which is compact, accurate, simple to operate, and durable.

A practical embodiment of the invention is represented in the accompanying drawings, in which, Fig. 1 represents a three point contact diameter gauge with my improvements applied thereto, the gauge being shown in plan.

Figure 1:
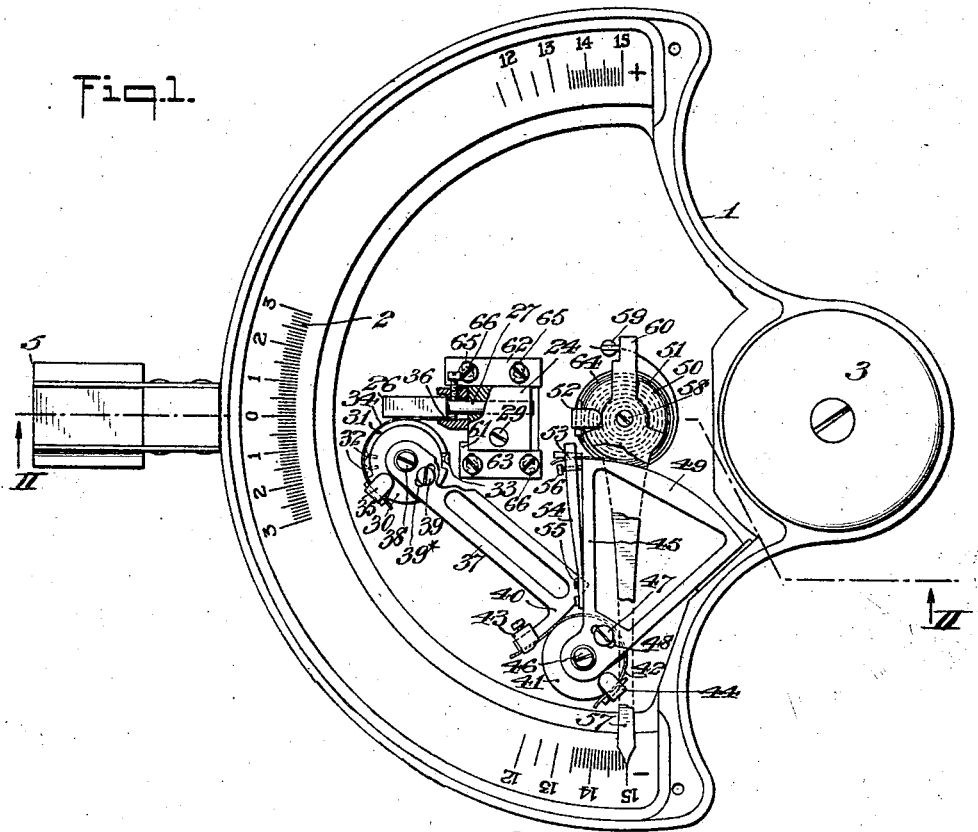
Figure 2:
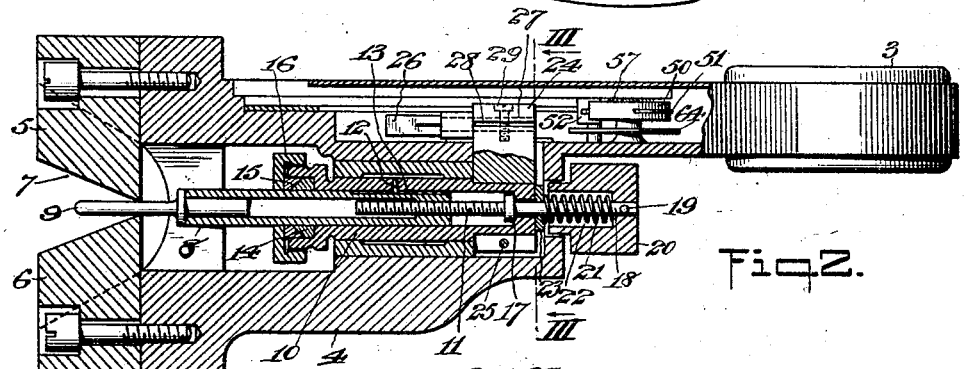
Fig. 2 represents a section taken in the plane of the line II—II of Fig. 1.

The body portion of the gauge is denoted by 1, and it is provided with a large semi-circular scale 2 in its upper face, which body portion is also provided with a suitable handle 3.

A lug 4 depends from the bottom of the body portion 1 of the gauge. Two jaws 5 and 6 are carried by the body portion 1 and lug 4, respectively which jaws have inclined straight walls forming a substantially V-shaped recess 7 for the reception of the piece to be measured.

The gauge comprises generally two mechanisms, viz; an adjustable plunger mechanism which has a rectilinear reciprocating motion and which includes the measuring pin; and a motion converting and amplifying mechanism which has a circular motion and which includes the scale pointer.

The plunger 8 herein shown as a tube, is provided at its front end with a measuring pin 9, which plunger is adjustable longitudinally in a sleeve 10, by means of an adjusting screw 11. This plunger 8 is held from rotating in the sleeve 10, by a pin 12 and elongated groove 13.

The means for clamping the plunger to and releasing it from the sleeve is herein shown as comprising a split cone ring 14 which coacts with a clamping ring 15 having a flaring recess for receiving the cone of the split ring 14; a nut 16, which has a screw threaded engagement with the sleeve 10, serving to exert more or less endwise pressure on the clamping ring 15 and split ring 14 to lock and release the plunger and sleeve. This nut is located in the open space between the body portion 1 and lug 4.

The plunger adjusting screw 11 is provided with a shoulder 17, which bears against the bottom of the recess in the sleeve 10, within which the plunger 8 is located and to the rear of this shoulder 17, the adjusting screw 11 is provided with a plain extension 18 to which a thumb nut 20 is pinned at 19. A coil spring 21 located in the recess 22 in the thumb nut 20 surrounds the extension 18 of the adjusting screw, and is interposed between a loose collar 23 and the bottom of said recess for holding the shoulder 17 of the adjusting screw snugly against its seat.

Figure 3:
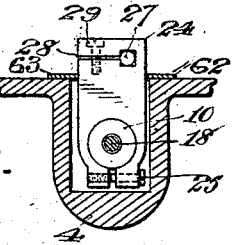
Fig. 3 represents a detail section taken in the plane of the line III—III of Fig. 2.

A split clamp 24 (see Fig. 3) is mounted on the reduced rear end of the sleeve 10, a screw 25 being utilized for securing said clamp to the sleeve after the clamp has been adjusted rotatively on the said sleeve. This clamp 24 projects upwardly through the bottom of the body portion 1 of the gauge and above said bottom a pin is secured to the clamp, which pin comprises a squared exposed portion end 26 having a plane working surface and a round shank 27. This round shank is inserted into the clamp 24, said clamp being split at 28 and provided with a clamp screw 29 for securing the pin rigidly to the clamp after it has been adjusted rotatively to bring its plane surface into the proper position.

I will now proceed to describe the mechanism mounted on the bottom of the body portion 1, for converting and amplifying the reciprocating rectilinear movement of the plunger mechanism. The first rocking member of the amplifying mechanism is denoted by 30 and it consists of a roller provided with a segment 31 having a concentric surface, which segment is securely fastened at 32 to the roller 30. The free end of this segment is engaged by the tapered head of an adjusting screw 33 so that as the screw is turned inwardly or outwardly, the segment 31 will be expanded or contracted for slightly increasing or diminishing the working radius of the said concentric surface. This concentric surface of the roller 30 is arranged to coact with the plane surface of the rectilinearly reciprocating pin 26, 27, and a flexible connecting band 34 is located between and extends along the coacting surfaces of the said pin and said roller, one end of which band is secured to the periphery of the roller 30 by the clamp 35, and the other end of which band is secured to the squared portion 26 of the pin by the clamp 36.

Either end of this band may be adjusted longitudinally by means of the clamps 35 and 36 to change the relative positions of the pin and roller. An arm 37 projects from the axis 38 of the roller 30, which arm is rotatively adjustable with respect to the roller by means of a pin and slot connection 39, 39*. The free end of this arm is provided with a segment 40 having a concentric surface of greater diameter than the concentric surface which coacts with the plane surface of the pin.

A second rocking member comprises a roller 41 having its concentric surface arranged to coact with the concentric surface of greater diameter on the segment 40 of the roller 30. A flexible connecting band 42 is located between these two surfaces and in extended contact therewith, one end of the said band being secured to the arm 37 by the clamp 43, and the other end of the said band being secured to the roller 41 by the clamp 44. Either end of this band may also be longitudinally adjustable by the manipulation of either of these clamps 43 and 44.

An arm 45 projects from the axis 46 of the roller 41, which arm is rotatably adjustable with respect to the roller 41 by means of a pin and slot connection 47, 48 and is provided with a segment 49 having a concentric surface of greater diameter.

A third rocking member comprises a roller 50 having its concentric surface of lesser diameter arranged to coact with the concentric surface 49 of larger diameter of the roller 41. A flexible connecting band 51 is located between and extends along these two coacting concentric surfaces of the rollers 41 and 50, one end of which band is secured to the roller 50 by the clamp 52 and the other end of which band is secured to the roller 41 by the clamp 53, which clamp, in the present instance, is carried by a spring arm 54, secured at 55 to the arm 45 and having an adjusting screw 56 for adjusting the arm 54 to adjust the end of the flexible band 51 longitudinally.

A scale pointer 57 is mounted on the axis 58 of the roller 50 in position to travel over the scale 2 in the upper face of the body portion of the gauge.

A stop 59 is arranged in position to limit the movement of the pointer 57 in one direction by engaging an extension 60 of said pointer. A stop 61 is arranged in position to limit the outward movement of the plunger 8 by engaging the clamp 24, which stop is shown as herein forming a part of one of a pair of guide plates 62, 63 for guiding the clamp 24 in its longitudinal movement.

All of the parts are yieldingly held at the limit of their movement in one direction, and the flexible connecting bands 34, 42, 51 are kept stretched at all times, in order to prevent any lost motion, by providing a coil spring 64, one end of which is fastened to the roller 50 and the other end of which is secured to the stud which forms the stop 59.

To bring the plane surface of the pin 26, 27 in close proximity to the concentric surface of the roller 30, the clamp 24 is rotatively adjustable on the axis of the plunger 8 and the pin is rotatively adjustable in the clamp. Therefore, the pair of guide plates 62, 63, for the clamp may be made laterally adjustable by providing laterally elongated slots 65 for the set screws 66.

In use, the measuring point 9 is set to the desired position with respect to the diverging side walls of the recess 7. This is accomplished by loosening the thumb nut 16 and then turning the thumb nut 20, and thereby the screw 11 to move the plunger 8 forwardly or backwardly to the desired point. The thumb nut 16 is then tightened, thereby locking the plunger 8 to the sleeve 10 which carries the clamp 24. When the parts are thus adjusted, the standard measuring piece when inserted into the recess 7 will move the plunger sufficiently to bring the pointer of the amplifying mechanism opposite the zero point on the scale 2. When the piece to be measured proves to be too small in diameter, it will force the scale pointer past its zero position to a minus reading. If the piece to be measured proves to be too large in diameter it will not move the scale pointer up to the zero reading but the pointer will stop at some plus reading on the scale.

It will be understood that by the adjustment of the segment 31 on the roller 30, the concentric surface of the said roller can be enlarged or ensmalled and in this way the working radius can be changed and the total ratio of the radii of the various rollers or roller sections can be controlled even if each individual radius should vary slightly from the normal size.

It will also be understood that by the adjustment both of the clamp 24 and of the pin 26, 27, the plane surface of the portion 26 of the said pin can be brought into close proximity to the concentric surface of its adjacent roller 30 and in parallelism therewith.

It will be noted that in the converting and amplifying mechanism, the flexible connecting bands are located between and extend along the coacting surfaces between which they pass, thus ensuring absolute accuracy of the relative movements of the several parts.

From the above description it will also be seen that I have provided a gauge in which a slight rectilinear motion is converted into an extended circular motion within a compact and easily handled instrument, the instrument at the same time being of extreme accuracy and with a scale of great openness.

It is evident that various changes may be made in the construction, form and arrangement of the several parts without departing from the spirit and scope of my invention; hence I do not wish to be limited to the particular embodiment herein shown and described, but

What I claim is:—

1. In a gauge, a body portion, a sleeve having a limited rectilinear reciprocating movement therein, means yieldingly holding the sleeve at the limit of its outward movement, a plunger having a measuring pin, longitudinally adjustable in the sleeve, a clamp carried by the sleeve, a pin carried by the clamp, and motion converting and amplifying mechanism operated by said pin.

2. In a gauge, a body portion, a sleeve having a limited rectilinear reciprocating movement therein, means yieldingly holding the sleeve at the limit of its outward movement, a plunger having a measuring pin, longitudinally adjustable in the sleeve, a clamp carried by the sleeve, a pin carried by the clamp, motion converting and amplifying mechanism operated by said pin, and means whereby the clamp and the pin may be rotatively adjusted.

3. In combination, a body portion, a sleeve having a limited rectilinear reciprocating movement therein, means yieldingly holding the sleeve at the limit of its outward movement, a plunger having a measuring pin, carried by the said sleeve, a clamp carried by the sleeve, a pin carried by the clamp, motion converting and amplifying mechanism operated by said pin, a plunger adjusting screw carried by the sleeve, and means for securing the plunger to and releasing it from the sleeve.

In testimony, that I claim the foregoing as my invention, I have signed my name, this 20th day of October, 1920.

ERIK H. ALDEBORGH